(No Model.)

R. WILLIAMS.
MACHINE FOR SAWING HOOPS FROM POLES.

No. 271,672. Patented Feb. 6, 1883.

Witnesses.
S. N. Piper
E. B. Pratt

Inventor.
Robert Williams
by R. H. Eddy atty.

UNITED STATES PATENT OFFICE.

ROBERT WILLIAMS, OF BOSTON, ASSIGNOR, BY MESNE ASSIGNMENTS, TO HIMSELF AND WILLIAM BOWKER, OF SOMERVILLE, MASSACHUSETTS.

MACHINE FOR SAWING HOOPS FROM POLES.

SPECIFICATION forming part of Letters Patent No. 271,672, dated February 6, 1883.

Application filed November 10, 1882. (No model.)

*To all whom it may concern:*

Be it known that I, ROBERT WILLIAMS, of Boston, in the county of Suffolk, of the State of Massachusetts, have invented a new and useful Improvement in Machines for Sawing Hoops from Poles; and I do hereby declare the same to be described in the following specification and represented in the accompanying drawings, of which—

Figure 1:
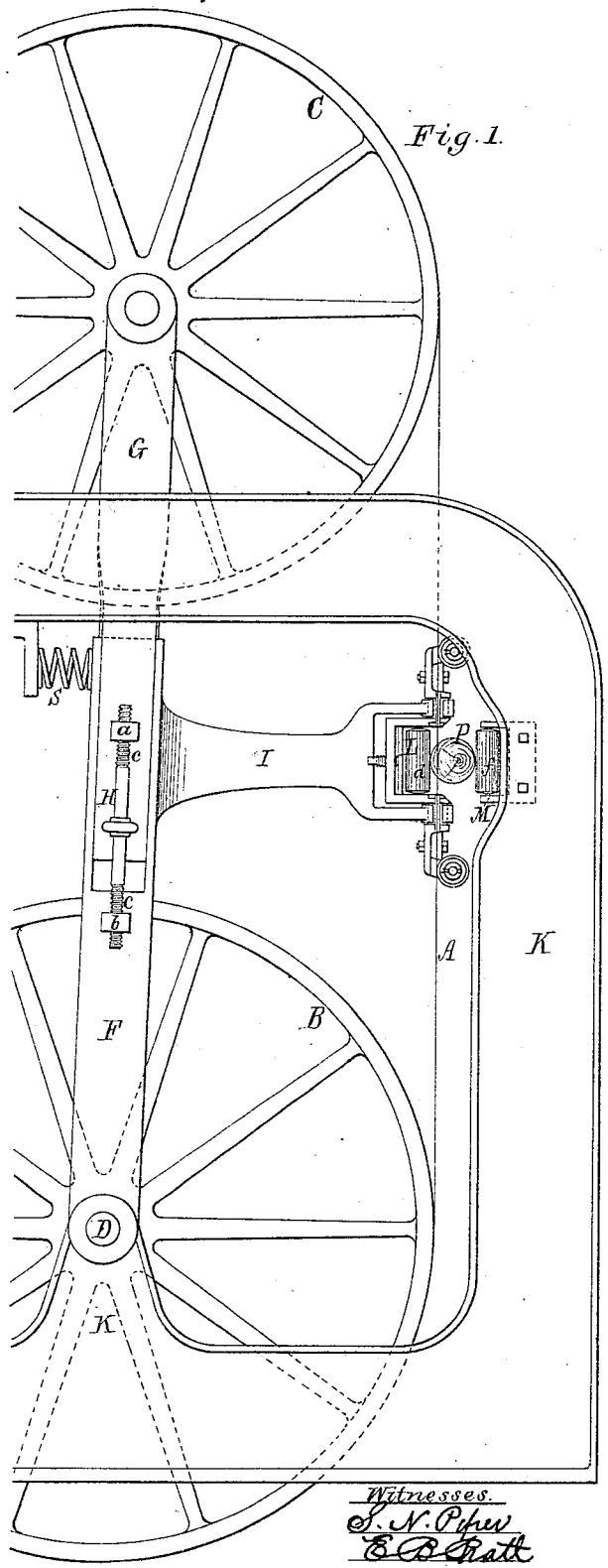
Figure 2:
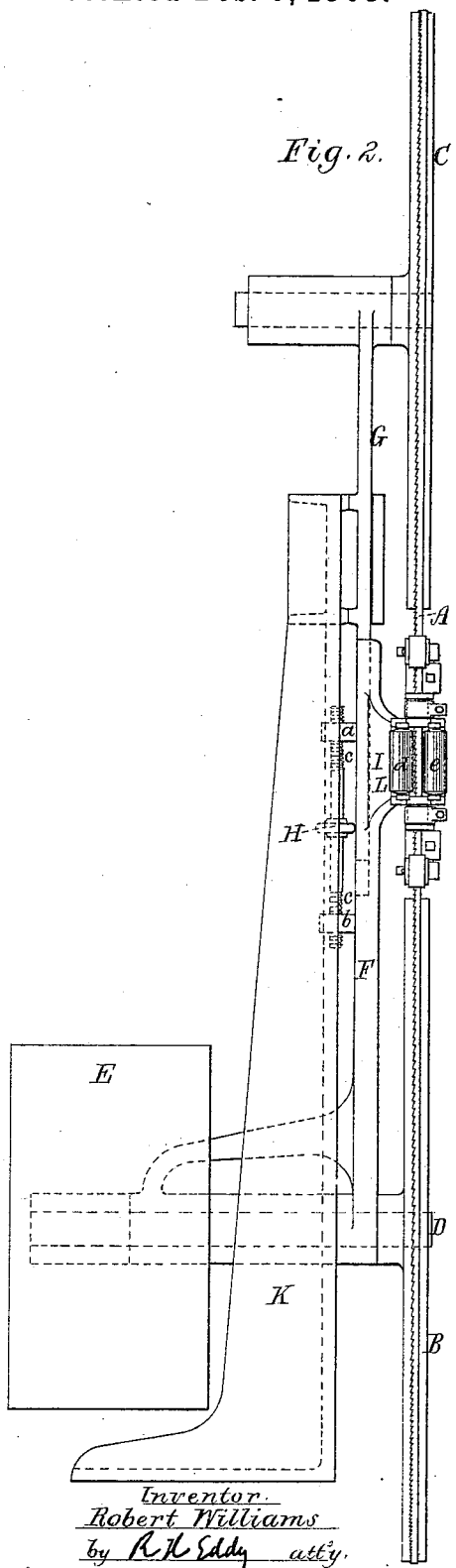

Figure 1 is a front elevation, and Fig. 2 an end view, of mechanism embodying my invention, the nature of which is defined in the claims hereinafter presented.

In this mechanism an endless band-saw is used, it being shown at A as supported by two wheels, B and C, on and about which it is arranged, as represented. The lower of these wheels is fixed upon a shaft, D, supported by a frame, K, and provided with a driving-pulley, E.

Pivoted on the shaft is a vibratory arm, F, having adapted to it, so as to be capable of being moved lengthwise on or in it, a slide-bar, G.

To the upper part of the bar G the saw-supporting wheel is pivoted. Lugs $a\,b$, projecting from the arm F and bar G, as represented, have screwed through them a rod, H, provided with screw-threads $c\,c$. On revolving the rod the bar G may be moved upward or downward, as occasion may require, to regulate the tension of the saw.

From the arm F another arm, I, projects at right angles to such arm F, it being furcated, as represented. The arm I sustains the mechanism for guiding the hoop-pole to the saw, and for bending the latter in order to cause it to cut in a pole a kerf in parallelism with the median longitudinal line of the outer surface of the hoop or portion separated by the saw from the pole.

Of this mechanism, (shown at L,) $d\,e$ are the hoop-supporting rollers, the hoop-pole P, while being sawed, passing between them and another roller. $f$, supported by a bracket, M, fixed to the frame K.

As a hoop usually varies in diameter, or is more or less irregular in transverse section from one end to the other of it, it will be seen that while it may be passing between the rollers $f$ and the rollers $d\,e$ it, as it may enlarge, will force the arm I and its arm F backward, so as to cause the saw to be correspondingly moved, a spring, S, supported by the frame K and bearing against the arm F, serving to move the arm in the opposite direction as the hoop-pole may diminish in diameter. By such means it will be seen that the thickness of the hoop severed from the pole will be preserved equal, or substantially so, throughout such hoop, however the pole may vary in section or diameter.

The arm F and its slide G may be said to constitute an arm or vibrator to swing like a pendulum, and therefore it may be termed the "pendulous" arm. It may be pivoted at its upper instead of at its lower part, in which case the wheel C would be the driving-wheel of the saw. Furthermore, in the place of the fixed bearing or roller $f$, another band-saw and its supporting and hoop-guide mechanism, as mentioned, may be employed to cut another hoop from the opposite part of the hoop-pole.

The said mechanism shown at L is substantially like such as is described and claimed in the specification of another application for a patent filed by me and William Bowker at the time of filing the application of which this specification constitutes a part.

I claim—

1. The combination of the fixed hoop bearing or roller $f$, substantially as specified, with one of the band-saw wheels B C and the hoop-guide mechanism L and its sustaining-arm I, supported, as set forth, by a pendulous arm, F G, so as to enable the saw and such hoop-guide mechanism to vibrate bodily, as and for the purpose explained.

2. The combination of the spring S and the fixed hoop bearing or roller $f$, substantially as specified, with one of the band-saw wheels B C and the hoop-guide mechanism L and its sustaining-arm I, supported, as set forth, by a pendulous arm, F G, so as to enable the saw and such hoop-guide mechanism to vibrate bodily, as and for the purpose explained.

3. The combination of the vibratory arm F and slide G and their adjusting mechanism— viz., the screw H and lugs *a b*, as described— with the band-saw and its two supporting-wheels, such arm being pivoted to the driving-shaft of such saw, and all being substantially and to operate as set forth.

4. One of the band-saw wheels B C and the hoop-guide mechanism L, supported by a pendulous arm, F G, so as to enable the saw and such hoop-guide mechanism to vibrate bodily, as and for the purpose set forth.

ROBERT WILLIAMS.

Witnesses:
R. H. EDDY,
E. B. PRATT.